UNITED STATES PATENT OFFICE.

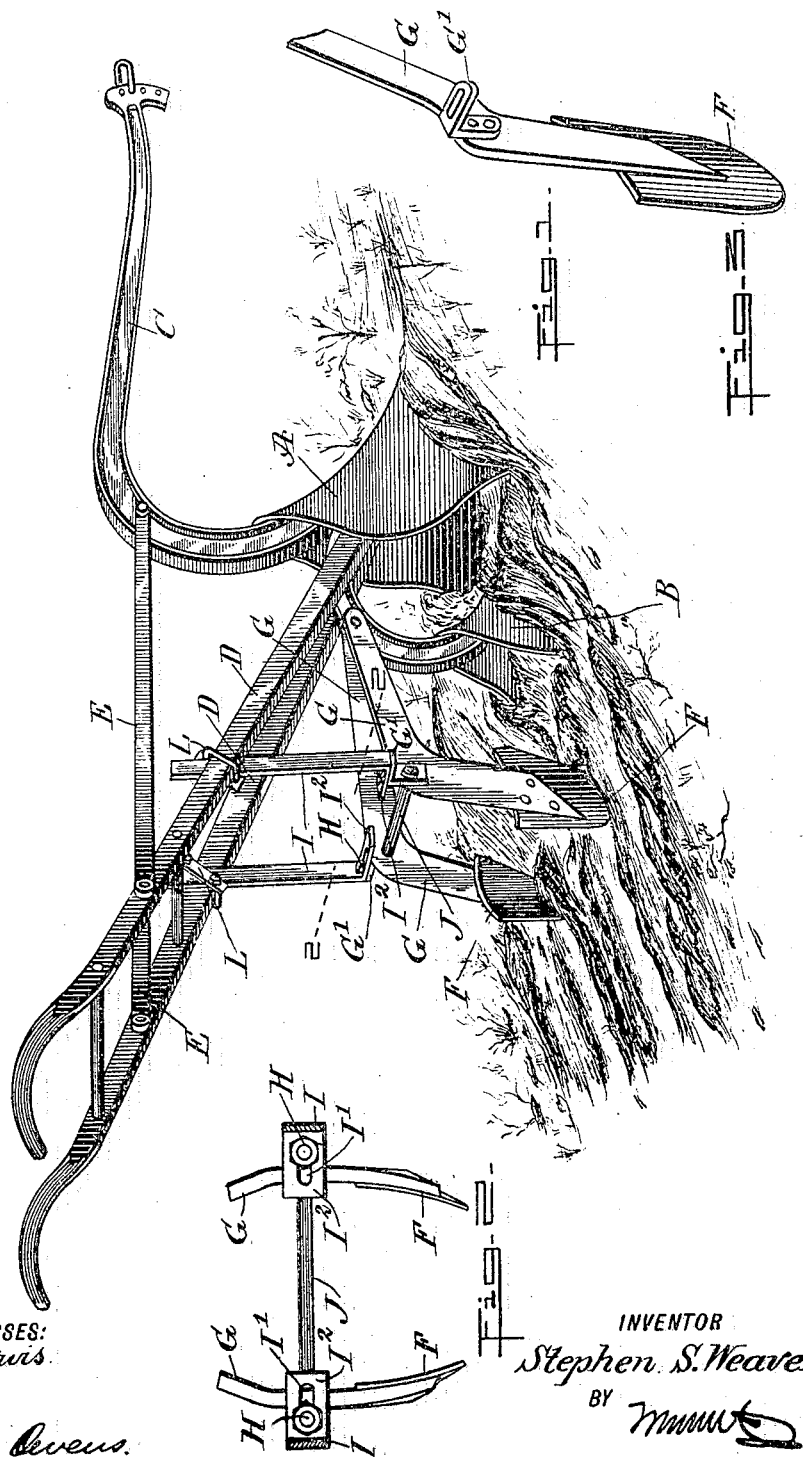

STEPHEN SAMUEL WEAVER, OF CARROLLTON, MISSOURI.

PLOW.

No. 809,870.     Specification of Letters Patent.     Patented Jan. 9, 1906.

Application filed February 15, 1905. Serial No. 245,738.

*To all whom it may concern:*

Be it known that I, STEPHEN SAMUEL WEAVER, a citizen of the United States, and a resident of Carrollton, in the county of Carroll and State of Missouri, have invented a new and Improved Plow, of which the following is a full, clear, and exact description.

The invention relates particularly to a plow intended for preparing the soil for seed, in which plow means are provided for acting on the subsoil at the bottom of the furrow.

The object of the invention is to provide a device which may be readily attached to existing plows of this class and by means of which the subsoil may be effectively cultivated and furrows prepared for the reception of the seed.

To this end the invention resides in certain special features of construction and arrangement of parts, which will be fully set forth hereinafter and pointed out in the claims.

Reference is to be had to the accompanying drawings, which illustrate the preferred embodiment of the invention, in which drawings like characters of reference indicate like parts in the several views, and in which—

Figure 1 is a perspective view of the apparatus in use, showing the main share, the auxiliary or subsoiler share, and my improved pulverizer-blades and their connected parts in operative adjustment. Fig. 2 is a sectional plan view on the line 2 2 of Fig. 1, and Fig. 3 is an enlarged perspective view of one of the pulverizer-blades and its beam.

In Fig. 1, A indicates the main share, and B the subsoiler, which are joined in the usual or any desired manner to the plow-beam C and handles D. E indicates braces connecting the handles with the beam in the usual manner. F indicates the two pulverizer-blades, which according to my invention stand vertically in the furrow and diagonally with respect to the line of movement of the plow, so as to catch the earth of the subsoil as it is thrown up by the share B, pulverizing the earth and forming rows or cavities in which seed may be planted. In this manner the soil is effectually prepared for the reception of the seed. As will hereinafter appear, the pulverizing-blades F may be adjusted toward and from each other, so as to cause them to work near the center of the furrow or to actually engage and slice or trim the sides thereof. Each blade F is provided with a rigidly-attached beam G, which beams are provided at their upper ends with lateral or horizontal lugs E', orificed to receive bolts H, which also pass through slots I' in lugs $I^2$ at the lower ends of standards I. In this manner the beams G are attached to the lower ends of the standards, so that the beams, and consequently the blades F, may be adjusted toward and from each other. J indicates a tie-rod which extends between the beams G and is engaged therewith by nuts, so that by the adjustment of these nuts the before-described adjustment of the beams G may be effected. The beams G extend from the tie-rod J forward and are attached to a convenient part of the plow, as Fig. 1 shows, in such a manner as to allow the before-described adjustment of the beams. The standards I rise vertically from the beams G and are fastened rigidly to the respective handles D by means of clips L, which embrace the standards and the beams and which may be loosened at will to permit vertical adjustment of the standards and of the parts attached thereto. This arrangement permits of a wide range of adjustment of the pulverizing-blades both vertically and laterally or horizontally, enabling me to bring about a most thorough cultivation of the subsoil and to prepare it easily and cheaply for the reception of the seed.

Various changes in the form, proportions, and minor details of my invention may be resorted to at will without departing from the spirit and scope thereof. Hence I consider myself entitled to all such variations as may lie within the terms of my claims.

Having thus described the preferred form of my invention, what I claim as new, and desire to secure by Letters Patent, is—

1. In a plow, the combination with the share and subsoiler, the beam and handles, of two pulverizer-blades located behind the subsoiler, beams rigidly attached to said blades and extending upwardly and forwardly into connection with a part of the plow, standards connected respectively with the beams and adjustable thereon toward and from each other, a tie-rod extending between and connecting the beams, and means for adjustably connecting the standards respectively with the handles.

2. In a plow, the combination with the share and subsoiler, the beam and handles, of two pulverizer-blades located behind the subsoiler, beams rigidly attached to the pulverizer-blades and extending upwardly and thence forwardly in connection with a part of the plow, horizontally-extending lugs respectively attached to the beams, standards having at their lower ends lugs engaged with the lugs on the beams of the pulverizer-blades, means for adjustably connecting said lugs together, means for adjustably connecting the standards respectively with the handles, and a tie-rod extending between the beams of the pulverizer-blades.

In testimony whereof I have signed my name to this specification in the presence of two subscribing witnesses.

STEPHEN SAMUEL WEAVER.

Witnesses:
　LEE D. JONES,
　WALTER S. MELEN.